United States Patent [19]

Sheldrick

[11] 3,926,525
[45] Dec. 16, 1975

[54] PHOTOMETRIC APPARATUS INCLUDING A ROTATABLE OPTICAL DENSITY WEDGE

[75] Inventor: George Edward Sheldrick, Ilford, England

[73] Assignee: Ilford Limited, Essex, England

[22] Filed: May 8, 1974

[21] Appl. No.: 468,157

[30] Foreign Application Priority Data
May 16, 1973 United Kingdom............... 23401/73

[52] U.S. Cl. ................. 356/205; 350/314; 356/235
[51] Int. Cl.² ..................... G01J 1/40; G01N 21/22
[58] Field of Search ....... 356/205, 235, 89; 350/314

[56] References Cited
UNITED STATES PATENTS

| | | | |
|---|---|---|---|
| 2,478,406 | 8/1949 | Lamb | 356/205 X |
| 3,062,088 | 11/1962 | Bolz | 356/89 |
| 3,658,422 | 4/1972 | Wilkinson | 356/89 |
| 3,711,208 | 1/1973 | Abbondio | 356/205 X |

FOREIGN PATENTS OR APPLICATIONS
962,735   7/1964   United Kingdom................... 356/89

Primary Examiner—Palmer C. Demeo
Attorney, Agent, or Firm—Wenderoth, Lind & Ponack

[57] ABSTRACT

A photometric apparatus wherein a reference beam and a measuring beam are modulated by passing them through a light modulating system. The light modulating system comprises an optical density wedge having parallel isopaques which are contours of constant density and which is rotatable about an axis perpendicular to the plane of the wedge and which is so located in the photometric apparatus that rotation of the wedge in one direction increases the optical transmission of the reference path and decreases the optical transmission of the measuring path and rotation of the wedge in the other direction decreases the optical transmission of the reference path and increases the optical transmission in the measuring path.

3 Claims, 3 Drawing Figures

PHOTOMETRIC APPARATUS INCLUDING A ROTATABLE OPTICAL DENSITY WEDGE

BACKGROUND OF THE INVENTION

This invention relates to a photometric apparatus of the type in which there are two beams of light, i.e. a measuring beam and a reference beam, which fall alternately onto a photosensitive cell whose response in relation to the intensity of the beams being unequal is used to operate a servo motor to control by an optical wedge the degree of attenuation of the reference beam to compensate thereby for the lower intensity of the measuring beam.

The beams could originate from a test light source and a reference (standard) light source. By introducing a calibrated variable optical wedge in the reference beam the relative intensity of the light sources may be measured. In a different apparatus the beams might originate from the same light source and the variable wedge in the reference beam would be used to measure the absorption of a test piece in the measuring beam. Such test pieces could be a photographic plate or film obtained in an optical emission spectrograph, a mass spectrometer or an X-ray diffraction camera when the photographic image is a dark line whose optical density is of importance. Again the test pieces could be samples of coloured solutions produced in a colorimetric analytical process in which the depth of colour or the monochromatic optical density bears a known relationship with concentration. Also the test piece may be an exposed and processed coated photographic emulsion strip prepared to obtain the sensitometric characteristics of a photographic emulsion.

Such apparatus suffer from the disadvantage that if a high optical density is measured the range of light intensities falling on the photo-detector is wide corresponding to the anti-logarithm of the density range. Thus for an optical density 1.0 the intensity range on the photocell would be 10:1, and for density 2.0, 100:1, but for density 5.0 the intensity range would be 100,000:1, The design of a measuring system to handle large ranges of intensity measurement is complex and is attended by many problems.

However, in British Pat. No. 962,735 there is described a photometric apparatus wherein the intensity of a reference beam of light is compared with the intensity of a measuring beam of light by use of a photodetector, the reference and measuring beams of light following different paths but passing through the same light modulating system. The light modulation system is movable relative to the beams of light and is so located in the apparatus that movement of the system in one direction increases the optical transmission in the path of the reference beam and decreases the optical transmission in the path of the measuring beam, and movement of the system in the reverse direction decreases the optical transmission in the path of the reference beam and increases the optical transmission in the path of the measuring beams. In British Pat. No. 962,735 the light modulating system comprises two variable attenuators preferably in the form of a mask with tapered apertures. The variable attenuators move in unison across the paths of the reference and measuring beams. In British Pat. No. 962,735 it states that each of the two attenuators only need a range of A/2 whereas if only one attenuator were employed as hitherto, it would need to have the whole of the range A. Therefore a worthwhile improvement in the usable range of the apparatus described in British Pat. No. 962,735 is obtained.

However there are certain problems associated with the use of two variable attenuators which have to move in unison. For example a complicated gearing mechanism to ensure that they are driven in unison is required, the two illuminating beams should be spatially uniform and the shape of the two aperture blades should be the same.

SUMMARY OF THE INVENTION

It is the object of the present invention to provide a photometric apparatus of the type described in British Pat. No. 962,735 but wherein the measure beam and the reference beam both pass through a single attenuator.

According to the present invention there is provided a photometric apparatus of the type wherein the intensity of a reference beam of light is compared with the intensity of a measuring beam of light by use of a photodetector, the reference and measuring beams following different paths (referred to hereinafter as reference and measuring paths respectively) but both passing through the same light modulating system which comprises an optical density wedge having parallel isopaques which are defined as contours of constant density and which is rotatable about an axis perpendicular to the plane of the wedge and which is so located in the photometric apparatus that rotation of the wedge in one direction increases the optical transmission of the reference path and decreases the optical transmission of the measuring path, and rotation of the wedge in the other direction decreases the optical transmission of the reference path and increases the optical transmission in the measuring path. Preferably the wedge is in the form of a rotatable disc.

The optical density wedge may be rotated manually or automatically to restore the balance in response to an out-of-balance signal from the photo-detector. Most preferably however the optical wedge is rotated by a servo system which is responsive to an out-of-balance signal from the photo-detector.

The photometric apparatus of the present invention can operate over a much wider intensity range by virtue of the greater attenuation factor achievable by wedge attenuation. By working at a fixed aperture size there is much less dependence on the maintenance of a uniformity of illumination over the aperture.

Maintenance of accuracy of the aperture system described in British Pat. No. 962,735 requires a rigid coupling of the two aperture shapes and the careful positioning of these in front of the illuminating apertures. However the apparatus of the present invention by use of a single component attenuator automatically provides the mechanical stability requirement, and during measurement no requirement is placed on the position of the centre of rotation of the wedge other than that the illuminating apertures are to remain covered by the wedge. The measured value being a function only of angular rotation of the wedge.

In the photometric apparatus of the present invention the range of intensities of the light falling on the photocell is only 316:1 at a density of 5.0 compared with 100,000:1 for some of the prior art photometric apparatus wherein the reference beam only is attenuated by the optical wedge.

Furthermore the range of density on the linear rotating optical density wedge need only be half of the maximum density that the apparatus is required to measure, thus permitting the wedge to have a shallow gradient and hence a more precise measuring ability. By virtue of the lower attenuation in a light path required by the proposed system, the difficulty in preventing significant light leakage past the attenuating wedge is much reduced.

The photometric apparatus of the present invention may be for example a colorimeter or a densitometer for measuring sensitometric strips, spectrum plates or films of X-ray diffraction films. Also the photometric apparatus may be used to measure the difference in light intensity of two light sources.

When the photometric apparatus of the present invention is used as a densitometer to compare exposed photographic materials over the wide density range and contrast values experienced in the measurement of the characteristics of photographic materials, a compromise is required in the design of a servo balancing system between the provision of adequate positional discrimination at the low densities and the provision of adequate servo following capability at high rates of change of density usually present at the higher densities.

In the photometric apparatus of the present invention the extent of this compromise is reduced by virtue of the functional relationship which exists between the angular position of the optical density wedge and the density value being measured.

BRIEF DESCRIPTION OF THE INVENTION

The accompanying drawings will serve to illustrate the invention.

In the drawings FIGS. 1 and 2 are top plan views of a linear optical density wedge for use in the present invention.

FIG. 3 is a diagram of an optical system of a densitometer which is a photometric apparatus according to the present invention.

DETAILED DESCRIPTION OF THE INVENTION

Figure 1:
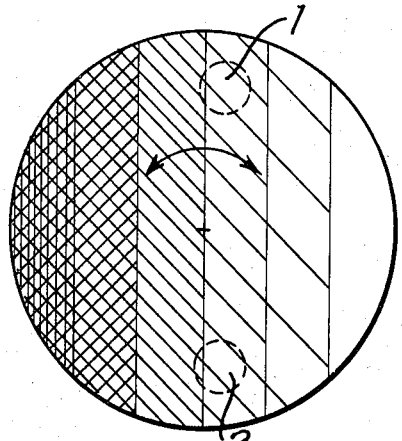
Figure 2:
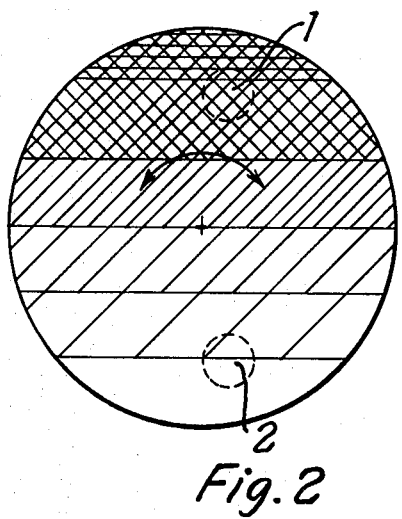

In FIGS. 1 and 2 the optical wedge is shown in the form of a disc and as illustrated in FIG. 1 the isopaques are vertical and in FIG. 2 horizontal. The positions which the measuring and reference beams would pass through the wedge are indicated at 1 and 2 respectively. The optical wedge is rotatable in its own plane about a central axis. If the region on the left of the FIG. 1 represents high density and there is a gradual decrease in density towards the right it may be seen that if the wedge is rotated through a small angle in a clockwise direction the measuring beam 1 is attentuated while the reference beam 2 is intensified and the reverse holds when the wedge is rotated in an anticlockwise direction.

Figure 3:
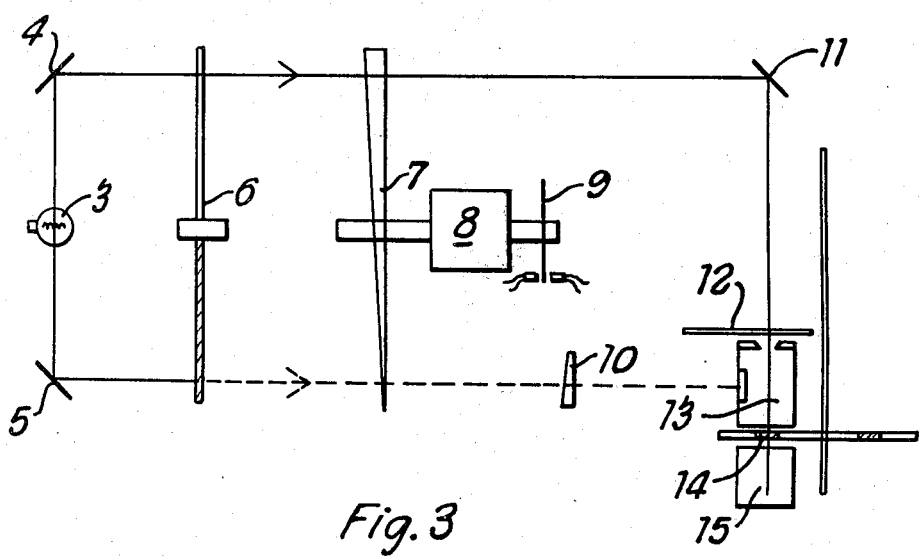

FIG. 3 shows the optical layout of a densitometer which makes use of the optical wedge of FIG. 1 as the light attenuator.

Light beams from opposite sides of a light source 3 are directed by reflectors 4 and 5 along the measuring and reference paths respectively. The beams are alternatively interrupted by a light chopper 6 and pass through preferably but not necessarily diametrically opposite positions on the wedge 7 (shown in FIG. 1) which may be turned through an angle by a servomotor 8. An encoding disc 9 is mounted on the spindle of the servomotor 8, and means (not shown) are provided for detecting the angular position of the wedge and providing an output signal characterised in having an inverse relationship to the cosine law density-angle relationship of the wedge and varying linearly with measured optical density. The measuring beam is directed by a reflector 11 through a film wedge test strip 12 which has varying densities along its length and enters a light integrating cavity 13 via a 'pot opal' diffuser. A zero setting optical wedge 10 is interposed in the reference beam which also enters the light integrating cavity 13. Light emerging from the cavity passes through a filter 14 selected from a series mounted on a disc the position of which may be changed manually or by a step motor in response to a signal. The filtered light impinges on a photomultiplier 15. If the two beams are unequal the photomultiplier generates a signal which after amplification is applied to the servomotor causing it to rotate the wedge until the equality of the beams is restored.

There is a non-linear relationship between the measured value of density and the angular position of the optical wedge generally of a cosine law and this provides additional instrument sensitivity at these low densities to provide excellent zero setting stability.

In operation the test strip is located so that an exposed region or the region of least density is in the measuring beam. The wedge 7 is set in a position such as in FIG. 2 i.e. with the higher density in the measuring beam, then the zero setting wedge 10 is adjusted to equalise the beams. As the test strip is moved across the beam so the measuring beam is attenuated and the out-of-balance signal from the photomultiplier causes the servomotor 8 to rotate the wedge 7 until the balance is restored. The angular rotation of the wedge is indicated by the encoder disc with readers which generate a digital encoded signal suitable for a digital presentation or for feeding into a computer.

In the embodiment of the photometric apparatus of the present invention as just described the optical wedge is rotatable in its own plane about an axis which is not required to be accurately defined with respect to the two beam apertures. The system permits close beam separation and a small diameter optical wedge permitting fast servo response by virtue of the low mechanical inertia of the assembly without affecting the angular sensitivity of the measuring system. With a uniform light intensity over the beam apertures, the system permits the two apertures to be non identical in size or shape.

What we claim is:
1. A photometric apparatus comprising:
   a light source;
   means for producing from the light emitted by said light source a measuring beam of light and a reference beam of light, said beams of light following different paths;
   a common light modulation system for both said beams positioned in the paths thereof;
   a photodetector and means for directing said beams of light on to said photodetector, said photodetector comprising means for determining and comparing the intensity of said measuring beam and said reference beam;
   said light modulating system comprising an optical density wedge having parallel isopaques which are contours of constant density; and
   said density wedge being rotatable about an axis perpendicular to the plane of said wedge and which is so located in the photometric apparatus that rotation of said wedge in a first direction increases the optical transmission of said reference beam and decreases the optical transmission of said measuring beam, and rotation of said wedge in a second direction decreases the optical transmission of said reference beam and increases the optical transmission in said measuring beam.

2. An apparatus as claimed in claim 1, wherein said wedge is in the form of a rotatable disc.

3. An apparatus as claimed in claim 1, further comprising servo system means for rotating said wedge responsive to an out-of-balance signal from said photodetector.

* * * * *